United States Patent [19]
Mattes

[11] Patent Number: 5,266,839
[45] Date of Patent: Nov. 30, 1993

[54] ADAPTER FOR ASYNCHRONOUS DEVICES

[75] Inventor: Michael E. Mattes, Easton, Pa.

[73] Assignee: Bell & Howell Phillipsburg Company, Skokie, Ill.

[21] Appl. No.: 747,949

[22] Filed: Aug. 21, 1991

[51] Int. Cl.$^5$ .......................................... H01H 47/00
[52] U.S. Cl. .................................... 307/115; 307/113; 307/118; 307/134; 307/144; 335/205
[58] Field of Search ............. 307/112, 113, 115, 116, 307/118, 134, 137, 144, 11, 31, 36, 38

[56] References Cited

U.S. PATENT DOCUMENTS

| | | | |
|---|---|---|---|
| 3,371,331 | 2/1965 | Buckholz | 340/674 |
| 4,095,123 | 6/1978 | Takahashi | 307/115 |
| 4,470,833 | 9/1984 | Wolfe | 55/271 |
| 4,540,964 | 9/1985 | Bleeke | 335/205 |
| 4,553,368 | 11/1985 | Ziller | 53/51 |
| 4,572,963 | 2/1986 | Nakao et al. | 307/115 |
| 4,576,287 | 3/1986 | Bingham et al. | 209/601 |
| 4,642,477 | 2/1987 | Grzanowki, Jr. et al. | 307/113 |
| 5,077,631 | 12/1991 | Cleary | 307/113 |

Primary Examiner—Jeffrey A. Gaffin
Attorney, Agent, or Firm—Millen, White, Zelano & Branigan

[57] ABSTRACT

A synchronizing circuit includes two switches for synchronizing the feeding of documents of a document feeder to the insert path of an insertion machine which is operative in accordance with a predetermined machine cycle to establish a given level of vacuum in a vacuum lines. The first switch closes in response to a given level of vacuum in the vacuum line and a rotary magnet driven by the insertion machine causes the second switch to close and then open at given machine cycles. The second switch and the first switch are in series with the document feeder; and, the second switch is operative to be closed and be held closed by the rotary magnet so that the document feeder is operative only upon the occurrence of both a given level of vacuum in the vacuum line and the predetermined proximity of the rotary magnet to the second switch.

3 Claims, 1 Drawing Sheet

ADAPTER FOR ASYNCHRONOUS DEVICES

FIELD OF THE INVENTION

This invention relates to apparatus interposed between two, or more, disparate devices, each operating responsive to certain timing events, so that their operation becomes synchronized. More particularly, the invention relates to a synchronizing circuit for ensuring that two different devices made, for example, by different manufacturers, can be harmonized to operate in conjunction with one another.

BACKGROUND AND OBJECTS OF THE INVENTION

In the art of document handling and processing such as, for example, insertion machines which handle the insertion of bills, promotional materials, or the like, into envelopes prior to dispatch to a customer, it is common for a user of these types of machines separately to purchase from other manufacturers certain auxiliary devices, such as feeders which accumulate, and subsequently dispense into the insertion device, the various inserts to complete the particular package comprised of a particular set of inserts destined for a particular customer. It is not unusual for a particular insertion machine to have a plurality of auxiliary feeders associated therewith, so that a varying plurality of inserts can be inserted into an envelope destined, say, for customers located in a particular zip code area.

As those skilled in the art will know, insertion machines as represented, for example, by the apparatus disclosed in U.S. Pat. No. 4,955,185, assigned to the same assignee as this application, and the disclosure of which is incorporated by reference herein, typically operate repeatedly within a time interval known as a machine cycle. Thus, for example, the various steps performed by an insertion machine are timed to repeatedly occur at certain degrees of a machine cycle (DMC). It is therefore important for any auxiliary device, such as an insert feeder from a manufacturer other than that of the insertion apparatus, to operate at the appropriate degrees of the DMC of the insertion apparatus—the main device—so that inserts are fed by the feeder when the insertion apparatus has a need therefor.

Accordingly, it is a primary object of this invention to synchronize the operation of an auxiliary device attached to a main device to the operational cycle of the main device.

One of the major events within the DMC of insertion apparatus is the establishment of vacuum within the various component parts thereof. This vacuum is used, inter alia, to apply suction to documents so that they can be manipulated, e.g. moved to another station, for subsequent processing. In general, a plurality of such vacuum stations exist in any insertion machine. It is therefore both desireable, and necessary, to establish timely and proper vacuum levels at all points of the insertion device so that vacuum is available when, and as, needed. In practice, this calls for the initiation of vacuum, i.e. the start of air evacuation from various chambers and lines, at a DMC well before the DMC that such, now fully developed, vacuum is needed. In other words, the fluid inertia of the various vacuum circuits of the insertion apparatus has to be accommodated by starting the application of vacuum prior to its actual time of use so that it can develop to the desired levels when the time for its utilization has arrived. Thus, any auxiliary device which times the initiation of its own operational cycle to the start of vacuum application of the main device is likely to be severely premature, hence utterly useless.

Accordingly, it is yet another object of this invention to synchronize the operational cycle of a vacuum responsive auxiliary device attached to an also vacuum responsive main device to the time of actual utilization of vacuum by such main device.

Insertion machines of the type described generally have control logic which also governs the termination of vacuum when, for example, absence of envelopes, or inserts, to be stuffed is indicated. Such might be the case when a mailing to all customers has been completed or when there is an absence of (at least some) inserts that are required for a particular mailing. In such cases, the vacuum that was fully established at a certain DMC is terminated at a subsequent DMC. The control logic of the insertion machine makes the go, no go, decision on maintaining vacuum at some point of the machine cycle after initiation of vacuum but prior to the end of the machine cycle. Any auxiliary device therefore cannot be placed in operation until after the go, no go, decision has been made by the control logic and a continuation of vacuum has been ordered.

Thus, it is another object of the invention to prevent the actuation of a vacuum responsive auxiliary device attached to an also vacuum responsive main device until the main device has maintained vacuum beyond a certain point of its machine cycle.

SUMMARY OF THE INVENTION

In accordance with the invention, a vacuum responsive switch designed to initiate the feeding cycle from an auxiliary feeder to an also vacuum responsive main insertion machine is prevented from actuating the auxiliary feeder until after the control logic of the insertion machine has determined that vacuum is to be continued for application by the insertion device. A rotary magnetic switch is added to the vacuum responsive switch of the auxiliary feeder so that the auxiliary feeder is actuated only when both the vacuum responsive switch and the rotary magnetic switch are closed. The rotary magnetic switch is designed to close only after the control logic of the insertion machine has determined that a previously initiated vacuum-on condition is to be continued.

The foregoing and other objects, features and advantages of the invention will be apparent from the following more particular description of a preferred embodiment thereof, as illustrated in the accompanying drawings.

DETAILED DESCRIPTION

Figure 1:
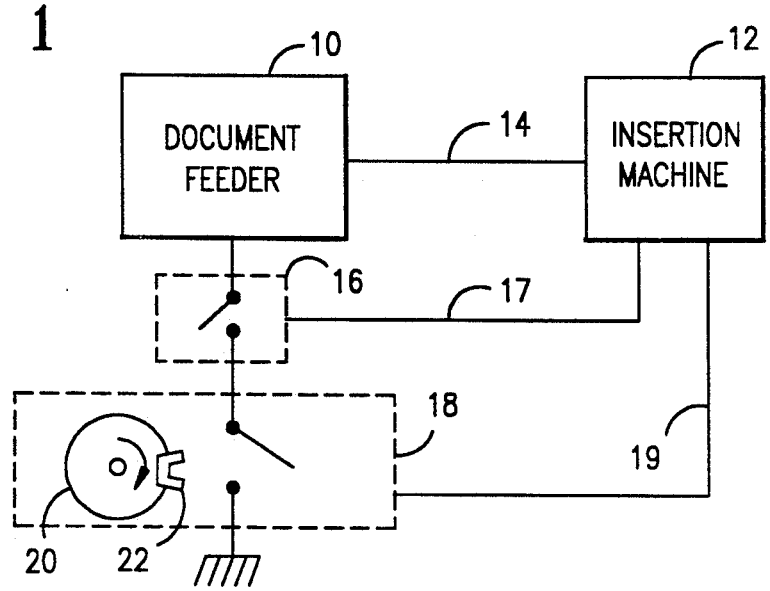
FIG. 1 is a schematic block diagram of the invention, including switch to actuate an auxiliary device cooperating with a main device.

With reference to FIG. 1, there is shown an auxiliary device 10, e.g. a document feeder, cooperating with a main device, such as an insertion machine 12 described above, by way of a path 14, indicated schematically. Auxiliary device 10 is actuated to feed inserts to main device 12 and includes a vacuum responsive switch 16 actuated by a vacuum line 17 from the main device 12. Auxiliary device 10 is normally operated to feed inserts when vacuum-responsive switch 16 has been closed by the application of vacuum from line 17.

Figure 2:
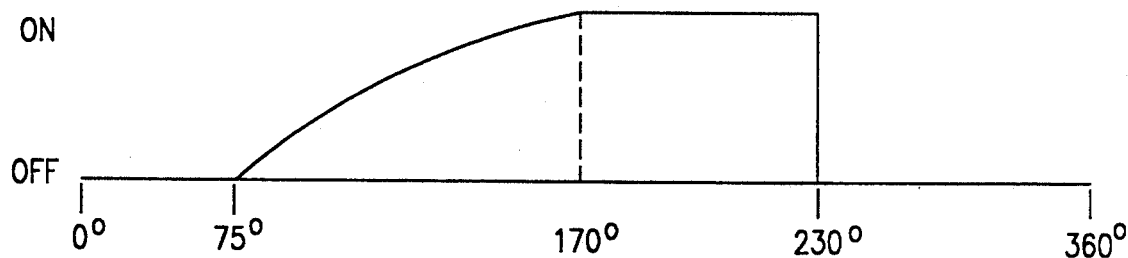
FIG. 2 is a timing diagram illustrating a typical vacuum application cycle within a complete machine cycle.

As so far described, and with reference to FIG. 2, which shows the vacuum timing diagram of main device 12, vacuum-responsive switch would normally energize sometime after 75 DMC of main device 12. FIG. 2 shows that full vacuum level is not established until some time after vacuum initiation at 75 DMC. For example, full vacuum level is reached only at, e.g., 170 DMC. The gradual buildup of vacuum to its full level between 75 DMC and 170 DMC is representative of the fluid inertia of the various vacuum lines and chambers in main device 12. It is noted that no vacuum controlled operations take place in main device 12 until the control logic (not shown) makes a go-no-go decision on whether to continue vacuum. Typically, such a decision is made shortly after full vacuum has been established, e.g., 175 DMC. FIG. 2 shows that such a decision has been made and vacuum is continued until 230 DMC. Vacuum-responsive switch 16, which may respond to the initiation of vacuum sometime shortly after 75 DMC, as shown in FIG. 2, would be totally premature since main device 12 does not actually respond to operate on a vacuum until sometime after 170 DMC.

Figure 3:
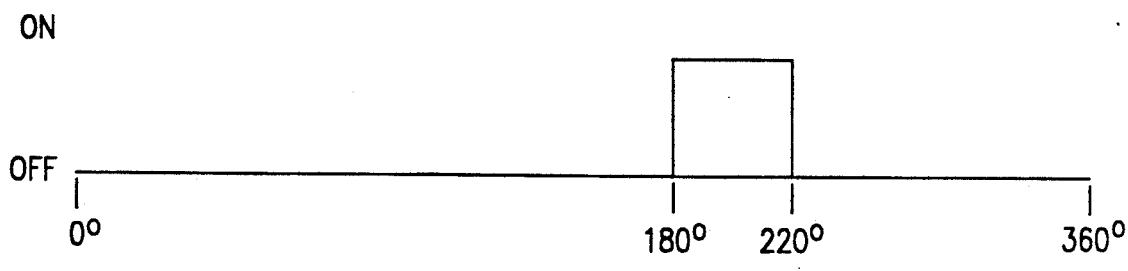
FIG. 3 is a timing diagram illustrating the switching cycle of a rotary magnetic switch utilized in the invention.

For this reason, a second, magnetic switch 18 is added in series with the vacuum-responsive switch 16. Magnetic switch 18 is comprised of a rotary disk 20 having a magnet assembly 22 mounted on a periphery thereof. The rotating disk 20 is driven by the main device 12 via a linkage 19 indicated schematically so that the magnetic switch 18 is actuated in accordance with the timing diagram shown in FIG. 3. As the timing diagram of FIG. 3 indicates, magnetic switch 18 is not actuated until after the control logic of main device 12 has indicated the continuance of vacuum, as shown in FIG. 2. Such actuation may, for example, be at 180 DMC and may continue until 220 DMC, shortly before vacuum shut down at 230 DMC. In the alternative, the duration of magnetic switch 18 operation may be extended to expire simultaneously with vacuum shut down at 230 degrees DMC.

Thus, auxiliary device 10 is not actuated until both vacuum switch 16 and magnetic switch 18 have been closed to thus synchronize the operation of auxiliary device 10 with main device 12.

While a preferred embodiment of the invention has been described in detail, various modifications and substitutions may be made in the described embodiment without departing from the spirit and scope of the invention as defined by the appended claims.

What is claimed is:

1. In combination with a document feeder for selectively feeding documents to an insert path of an insertion machine, a synchronizing circuit for synchronizing the feeding of documents by said document feeder to said insert path of said insertion machine;

said insertion machine being operative in accordance with a predetermined machine cycle and having a vacuum line and being adapted to establish a given vacuum level throughout said vacuum line;

first and second switches each having an open state and a closed state;

said first switch being operative to close in response to a given level of vacuum in said vacuum line;

a rotary magnet driven by said insertion machine in accordance with the machine cycle thereof and being rotated into and out of proximity to said second switch; and, said second switch being in series with said first switch and said document feeder and being operative to close and be held closed by a predetermined proximity of said magnet to said second switch whereby said document feeder is operative only upon the occurrence of both said given level of vacuum in said vacuum line and said predetermined proximity of said rotary magnet to said second switch.

2. The combination of claim 1 wherein said rotary magnet is rotated into said predetermined proximity to said second switch only after said given level of vacuum in said vacuum line has been obtained.

3. The combination of claim 2 wherein said insertion machine is adapted to release the vacuum in said vacuum line at a selected time in said machine cycle and wherein said rotary magnet is rotated out of said proximity to said second switch before said vacuum in said vacuum line is released.

* * * * *